Dec. 29, 1964     W. J. CLARKE     3,163,056
TORQUE AND SPEED CONTROL UNITS
Filed Oct. 25, 1962

United States Patent Office 3,163,056
Patented Dec. 29, 1964

3,163,056
TORQUE AND SPEED CONTROL UNITS
William J. Clarke, "Roseways," Tyrwhitt Ave., Johannesburg, Transvaal, Republic of South Africa
Filed Oct. 25, 1962, Ser. No. 233,086
Claims priority, Republic of South Africa, Nov. 10, 1961, R 61/2,348
3 Claims. (Cl. 74—677)

This invention relates to torque and speed control units for location between a prime mover (which term is used to include electric motors) and a driven element.

An object of the invention is to provide a novel unit which the applicant believes will have several useful advantages over the known art.

According to the invention a torque and speed control unit includes a casing, a shaft in the casing coupled to or adapted to be coupled to a prime mover, a planet gear wheel carrier fast with an end of the shaft in the casing, at least one planet wheel journalled towards the periphery of the carrier parallel with the shaft, a torque converter co-axial with the shaft and located on the prime mover side of the carrier, the converter comprising an annular pump element, a mating annular turbine element and a mating annular reactor element, means coupling the converter pump to the shaft, an annular sleeve or cage surrounding the shaft and fast with the turbine element, a first sun wheel for the planet fast with the sleeve and meshing with the planet on the prime mover side of the carrier, and a second sun wheel meshing with the planet on the opposite side of the carrier, journalled in the casing co-axially with the shaft and adapted for coupling to a driven element, the meshing zones of the planet being of different diameters and the arrangement being one in which the torque converter is in a chamber in the casing sealed from the carrier and sun wheels.

Further according to the invention a plurality of planet wheels are journalled towards the periphery of the planet carrier.

Also according to the invention the planet wheels have sets of teeth for meshing with the sun wheels which are co-axial but of different diameters, the set of larger diameter meshing with the sun wheel on the prime mover side of the planet carrier.

In order to illustrate the invention an example is described hereunder with reference to the accompanying drawings in which—

Figure 1:
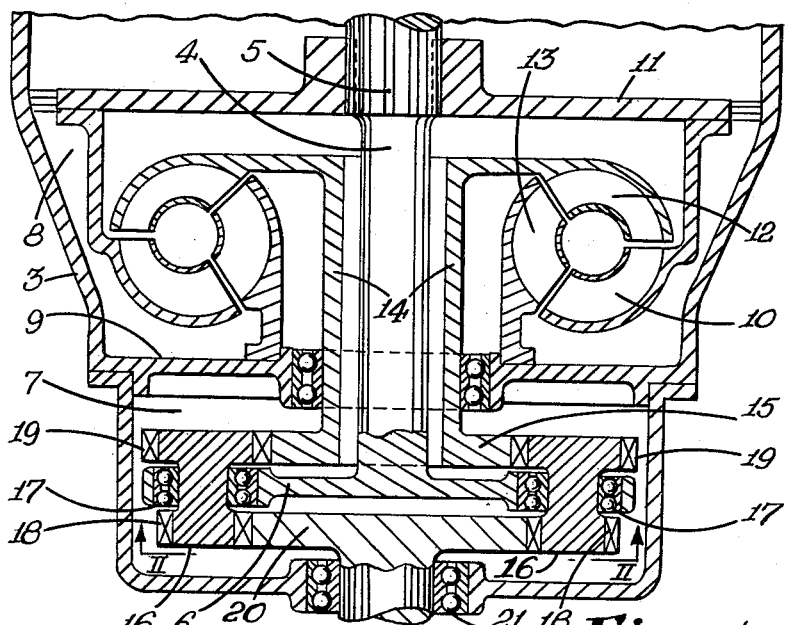
FIGURE 1 is a side elevation of a unit according to the invention.
Figure 2:
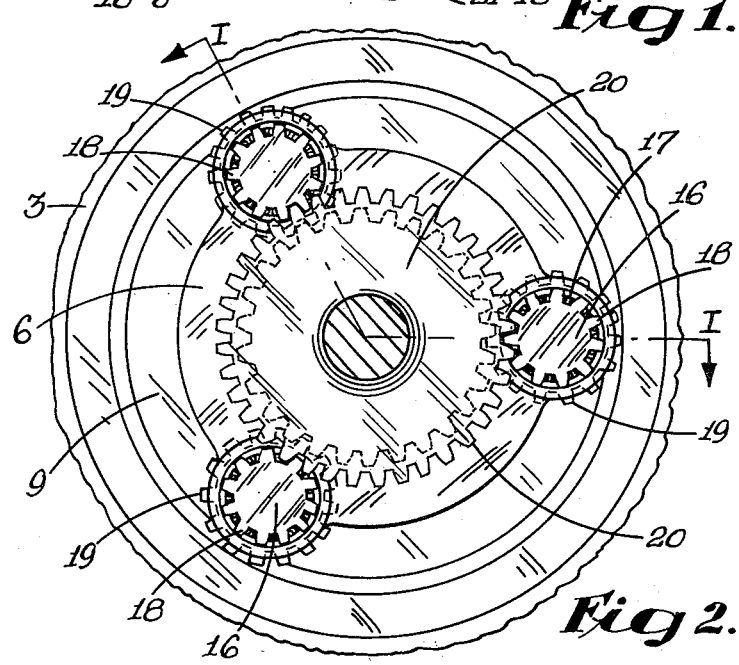
FIGURE 2 is a section on the line II—II of FIGURE 1.

The torque and speed control unit of the invention includes a casing 3 which acts as a housing for the various elements required. One of these elements is a main shaft 4 which is adapted to be coupled to a prime mover at its end 5 and has a planet carrier 6 at its end remote from the prime mover.

It will be observed that the interior of the casing is divided into two distinct sections 7 and 8, the two sections being sealed off from one another by wall 9. In section 8 a torque converter is located, the converter comprising an annular pump element 10 which is rotatably coupled to the shaft 4 through boss member 11, a turbine element 12, and a reactor element 13. Reactor element 13 may be of the stationary or "over-running" type. "Over-running" reactors find one of their main applications in automobile work, and they are characterised in that they change the converter into a "converter-coupling" as soon as the "coupling point" speed is reached. For purposes of description the reactor element 13 is shown as a stator. Further, in the embodiment described the reactor element is shown as forming the radially inner third segment of the section of the converter and it is anchored to the wall 9. Oil for the converter, in the case of an application to a motor vehicle, may be supplied from the vehicle gearbox sump.

The turbine runner 12 is fast with a sleeve 14 co-axial with shaft 4 and a sun wheel 15 is anchored to the sleeve as illustrated. Planet carrier 6 has three equally spaced planet gear wheels or nests 16 journalled at its periphery through the agency of suitable bearings 17. These planet wheels have two sets of teeth each, the sets being indicated by references 18 and 19 and the sets being of predetermined and different diameters. The set of teeth 19 meshing with the sun wheel 15 will be seen to be of greater diameter than set 18. Teeth set 18 meshes with a second sun wheel 20 co-axial with the shaft 4 and journalled in the casing through roller bearing 21. The second sun wheel is adapted to be coupled to a driven element, say the cardan shaft of a motor car.

The unit of the invention is intended to operate as follows. When the driving shaft 4 rotates planet carrier 6 immediately rotates at the same speed as the prime mover. The sun wheel 15 being stationary, or for all practical purposes stationary, during the period immediately following the starting up of shaft 4, the sun wheel 20 and the driven element rotate at some predetermined step-down speed according to the gearing employed in the same direction of rotation as shaft 4. By degrees the turbine element 12 of the converter begins to speed up due to the rotational movement of the pump element 11 with the result that the sun wheel 15 begins to catch up in speed relationship with the planet carrier 6. During the time when the sun wheel 15 is catching up with the planet carrier, a gradually increasing speed is developed on the output side of the unit; that is, the second sun wheel 20 begins to run at an ever increasing speed with increase in speed of the sun wheel 15. When the sun wheel 15 is running at the same speed as the planet carrier 6, the driven element is running at the same speed and in the same direction of rotation as the prime mover.

Should a retarding or braking force be applied to the driven element, the effect is to slow down the speed of rotation of the turbine element 12 in relation to the pump element 10, and this in turn slows down the speed of rotation of the sun wheel 15. The planet carrier 6 rotates at constant engine speed, and any variation in the speed of sun wheel 15 results in a corresponding variation in the speed of sun wheel 20. Thus an increase in torque due to an increase in tractive effort is absorbed by the torque converter and not by the drive shaft 4. No stalling forces are thrown on to the prime mover and the torque converter absorbs all road shocks in the transmission of a motor vehicle.

One important feature of the invention is that it is possible to provide an extremely compact unit as a result of the arrangement of the working parts, the unit forming a split-drive in which a percentage of the power transmitted passes through the torque converter. With the converter elements located as shown, that is the pump element concentrically mounted on the drive shaft and the reactor element supported on the housing as illustrated, the turbine element can be coupled to a sleeve concentric with the drive shaft 4. Such features have not been observed by the applicant in any of the known art.

Many more examples of the invention exist, each differing from the other in matters of detail only. Thus, in other examples of the invention changes are made in the number of planet wheels used and the diameters of the sets of teeth 18 and 19 are altered to suit design requirements.

The transmission can be disconnected by any of the methods commonly employed. For instance disconnection can be brought about—

(a) In the case of automobiles a clutch between the engine and the input shaft 4 could be used with a reverse gear box on the output shaft.

(b) In the case of tractors forward and reverse clutches of the multi-plate type could be employed on the output side of housing 3.

(c) For locomotives the converter could be of the "emptying and filling" type, as commonly employed, with a reverse gearbox fitted in the transmission.

Sleeve 14 could be in two parts with a multi-plate clutch inserted. The clutch could be located in housing 7 between wall 9 and sun gear 15. As only a fraction of the total power transmitted passes through sleeve 14 the clutch could be of smaller dimensions than clutches on the input or output shafts.

In another design two multi-plate clutches could be inserted in housing 7 between wall 9 and sun gear 15. One clutch could give a direct drive between sleeve 14 and sun gear 15. The second clutch by means of a step up countershaft drive, would make sun gear 15 rotate faster than sleeve 14, thus giving a two-speed drive.

As yet another alternative, pump 10 may be connected to shaft 4 through a suitable clutch.

I claim:

1. A torque and speed control unit including a casing, a power input shaft in the casing, a planet gear wheel carrier fast with an end of the input shaft in the casing, a plurality of planet wheels rotatably mounted on the carrier about axes parallel to the input shaft, the axes being disposed at the same radius struck from the centre of the carrier, a torque converter co-axial with the input shaft and located on the input shaft side of the carrier, the converter comprising an annular pump element, a mating annular turbine element and a mating annular reactor element, means coupling the converter pump to the input shaft, an annular cage surrounding the shaft and fast with the turbine element, a first sun wheel fast with the cage, co-axial therewith and meshing with the planet wheels on the input shaft side of the carrier, and a second sun wheel meshing with the planet wheels on the opposite side of the carrier, journalled in the casing coaxially with the input shaft and adapted for coupling to a driven element, the meshing zones of the planet wheels being of different diameters and the arrangement being one in which the torque converter is in a chamber in the casing sealed from the carrier and the sun wheels.

2. The unit claimed in claim 1 in which the reactor element is held stationary.

3. A torque and speed control unit including a casing, a power input shaft in the casing, a planet gear wheel carrier fast with an end of the input shaft in the casing, a plurality of planet wheels rotatably mounted on the carrier about axes parallel to the input shaft, the axes being disposed at the same radius struck from the centre of the carrier, a torque converter co-axial with the input shaft and located on the input shaft side of the carrier, the converter comprising an annular pump element, a mating annular turbine element and a mating annular reactor element, means coupling the convertor pump to the input shaft, an annular cage surrounding the shaft and fast with the turbine element, a first sun wheel fast with the cage, co-axial therewith and meshing with the planet wheels on the input shaft side of the carrier, and a second sun wheel meshing with the planet wheels on the opposite side of the carrier, journalled in the casing co-axially with the input shaft and adapted for coupling to a driven element, the meshing zones of the planet wheels defining sets of teeth engaging with the sun wheels which are of different diameters with the set of larger diameter meshing with the sun wheel on the input shaft side of the carrier, and the arrangement being one in which the torque converter is in a chamber in the casing sealed from the carrier and the sun wheels.

References Cited by the Examiner

UNITED STATES PATENTS

| 1,473,487 | 11/23 | McCarthy | 74—688 |
| 2,409,196 | 10/46 | Cunningham | 74—688 |
| 2,448,249 | 8/48 | Bonham | 74—688 |
| 2,739,494 | 3/59 | Russell | 74—688 X |
| 2,924,992 | 2/60 | Edsall | 74—688 |

DON A. WAITE, *Primary Examiner.*